(12) United States Patent
Mars et al.

(10) Patent No.: US 10,740,371 B1
(45) Date of Patent: Aug. 11, 2020

(54) SYSTEMS AND METHODS FOR INTELLIGENTLY CONFIGURING AND DEPLOYING A MACHINE LEARNING-BASED DIALOGUE SYSTEM

(71) Applicant: Clinc, Inc., Ann Arbor, MI (US)

(72) Inventors: Jason Mars, Ann Arbor, MI (US); Lingjia Tang, Ann Arbor, MI (US); Michael A. Laurenzano, Ann Arbor, MI (US); Johann Hauswald, Ann Arbor, MI (US); Parker Hill, Ann Arbor, MI (US); Yiping Kang, Ann Arbor, MI (US); Yunqi Zhang, Ann Arbor, MI (US)

(73) Assignee: Clinc, Inc., Ann Arbor, MI (US)

( * ) Notice: Subject to any disclaimer, the term of this patent is extended or adjusted under 35 U.S.C. 154(b) by 0 days.

(21) Appl. No.: 16/668,559

(22) Filed: Oct. 30, 2019

Related U.S. Application Data

(60) Provisional application No. 62/779,945, filed on Dec. 14, 2018.

(51) Int. Cl.
| | |
|---|---|
| *G06F 17/27* | (2006.01) |
| *G10L 15/22* | (2006.01) |
| *G06F 16/332* | (2019.01) |
| *G06K 9/62* | (2006.01) |
| *G06N 20/00* | (2019.01) |

(52) U.S. Cl.
CPC ....... *G06F 16/3329* (2019.01); *G06K 9/6215* (2013.01); *G06N 20/00* (2019.01)

(58) Field of Classification Search
CPC .............................. G10L 15/22; G10L 15/063
See application file for complete search history.

(56) References Cited

U.S. PATENT DOCUMENTS

| | | | | |
|---|---|---|---|---|
| 7,606,714 | B2 * | 10/2009 | Williams | .............. G10L 13/027 |
| | | | | 704/275 |
| 2009/0306995 | A1 * | 12/2009 | Weng | ................... G06Q 10/103 |
| | | | | 705/301 |
| 2014/0365226 | A1 * | 12/2014 | Sinha | ...................... G10L 25/00 |
| | | | | 704/275 |

(Continued)

*Primary Examiner* — Jialong He
(74) *Attorney, Agent, or Firm* — Padowithz Alce

(57) ABSTRACT

A system and method for intelligently configuring a machine learning-based dialogue system includes a conversational deficiency assessment of a target dialog system, wherein implementing the conversational deficiency assessment includes: (i) identifying distinct corpora of mishandled utterances based on an assessment of the distinct corpora of dialogue data; (ii) identifying candidate corpus of mishandled utterances from the distinct corpora of mishandled utterances as suitable candidates for building new dialogue competencies for the target dialogue system if candidate metrics of the candidate corpus of mishandled utterances satisfy a candidate threshold; building the new dialogue competencies for the target dialogue system for each of the candidate corpus of mishandled utterances having candidate metrics that satisfy the candidate threshold; and configuring a dialogue system control structure for the target dialogue system based on the new dialogue competencies, wherein the dialogue system control structure governs an operation of an automated dialogue agent.

20 Claims, 7 Drawing Sheets

(56) References Cited

U.S. PATENT DOCUMENTS

| | | | |
|---|---|---|---|
| 2015/0186155 A1* | 7/2015 | Brown | G06F 3/04817 |
| | | | 715/706 |
| 2016/0078866 A1* | 3/2016 | Gelfenbeyn | G10L 15/22 |
| | | | 704/9 |
| 2016/0260029 A1* | 9/2016 | Gelfenbeyn | G06N 5/022 |
| 2017/0199867 A1* | 7/2017 | Koji | G06F 17/271 |
| 2018/0308481 A1* | 10/2018 | Cohen | G10L 15/22 |
| 2019/0115027 A1* | 4/2019 | Shah | G10L 15/30 |
| 2019/0130904 A1* | 5/2019 | Homma | G06N 20/00 |

* cited by examiner

Configuring a Root Node S210

Configuring State Nodes S220

Configuring Transitional Edges S230

Configuring Logic Operations S235

Deploying the Machine Learning Control Structure S240

- Implementing Dialogue System Gap Assessment S410
  - Accessing Corpora of Dialogue Data S412
  - Assessing the Corpora of Dialogue Data S414

- Identifying Emerging Dialogue Competencies S420

- Sourcing Training Data & Configuring Training Corpus S430

- Configuring a Dialogue System Control Structure S440

- Enabling the New Conversational Dialogue Nodes S450

FIGURE 4

SYSTEMS AND METHODS FOR INTELLIGENTLY CONFIGURING AND DEPLOYING A MACHINE LEARNING-BASED DIALOGUE SYSTEM

CROSS-REFERENCE TO RELATED APPLICATIONS

This application claims the benefit of U.S. Provisional Application No. 62/779,945, filed 14 Dec. 2018, which is incorporated in its entirety by this reference.

GOVERNMENT RIGHTS

The subject matter of the invention may be subject to U.S. Government Rights under National Science Foundation grants: NSF SBIR Phase 1 Grant-1622049 and NSF SBIR Phase 2 Grant-1738441.

TECHNICAL FIELD

The inventions herein relate generally to the machine learning and artificially intelligent dialogue systems fields, and more specifically to a new and useful system and method for intelligently configuring a machine learning-based conversational agent in the machine learning field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for generating responses to users may not fully satisfy queries and commands posed by a user for which there are no predetermined rules to provide a meaningful response or result to the user.

Additionally, while machine learning enhances capabilities of artificially intelligent conversational systems, inefficiencies continue to persist in the underlying control structures used for controlling the underlying machine learning models performing classification and predictive functions of the artificially intelligent conversation systems.

Therefore, there is a need in the machine learning field for systems and methods that enable a configuring of a dynamic dialogue system control structure that is capable of evolving to handle simple or complex conversations between a virtual dialogue agent and a user. The embodiments of the present application described herein provide technical solutions that address, at least, the need described above, as well as the deficiencies of the state of the art described throughout the present application.

BRIEF SUMMARY OF THE INVENTION(S)

In one embodiment, a system for intelligently configuring a machine learning-based dialogue system of a subscriber includes a user interface for configuring a machine learning-based dialogue system for a subscriber that is in operable communication with a remote machine learning-based dialogue service; the remote machine learning-based dialogue service being implemented by a distributed network of computers includes: (i) a conversation deficiency module that implements a conversational deficiency assessment of a target dialog system of the subscriber to the machine learning-based dialog service, wherein implementing the conversational deficiency assessment includes: (i-a) identifying one or more distinct corpora of mishandled utterances based on an assessment of the one or more distinct corpora of dialogue data; (i-b) identifying one or more candidate corpus of mishandled utterances from the one or more distinct corpora of mishandled utterances as one or more suitable candidates for building one or more new dialogue competencies for the target dialogue system if one or more candidate metrics of the one or more candidate corpus of mishandled utterances satisfy a candidate threshold; (ii) machine learning model configuration module that: (ii-a) builds the one or more new dialogue competencies for the target dialogue system for each of the one or more candidate corpus of mishandled utterances having candidate metrics that satisfy the candidate threshold; and (ii-b) constructs a corpus of training data for training one or more machine learning models defining a target new dialogue competency of the one or more new dialogue competencies of the target dialogue system, wherein constructing the corpus of training data includes sourcing training data from one or more distinct sources of machine learning training data based on attributes of mishandled utterance data within a target corpus of mishandled utterances of the one or more distinct corpora of mishandled utterances; and (iii) configures a dialogue system control structure for the target dialogue system based on the one or more new dialogue competencies, wherein the dialogue system control structure governs an operation of an automated dialogue agent of the target dialogue system of the subscriber.

In one embodiment, a method for intelligently configuring a machine learning-based dialogue system includes implementing, by a machine learning-based dialogue service, a conversational deficiency assessment of a target dialog system of a subscriber to the machine learning-based dialog service, wherein implementing the conversational deficiency assessment includes: (i) identifying one or more distinct corpora of mishandled utterances based on an assessment of the one or more distinct corpora of dialogue data; (ii) identifying one or more candidate corpus of mishandled utterances from the one or more distinct corpora of mishandled utterances as one or more suitable candidates for building one or more new dialogue competencies for the target dialogue system if one or more candidate metrics of the one or more candidate corpus of mishandled utterances satisfy a candidate threshold; building the one or more new dialogue competencies for the target dialogue system for each of the one or more candidate corpus of mishandled utterances having candidate metrics that satisfy the candidate threshold; and configuring a dialogue system control structure for the target dialogue system based on the one or more new dialogue competencies, wherein the dialogue system control structure governs an operation of an automated dialogue agent of the target dialogue system of the subscriber.

In one embodiment, each of the one or more distinct corpora of mishandled utterances relates to a collection of utterances posed to the target dialogue system that were ineffectively handled by the target dialogue system.

In one embodiment, each of the one or more distinct corpora of mishandled utterances relate to one or more distinct groupings of historical utterances posed to the dialog system of which the dialogue system failed to provide a successful response to historical utterances of the one or more groupings of historical utterances.

In one embodiment, a subset of mishandled utterances defining each of the one or more distinct corpora of mishandled utterances relates to a grouping of utterances having a dialog intent that is misaligned with an intent applied or computed by the target dialogue system.

In one embodiment, the assessment of the one or more distinct corpora of dialogue data of the target dialog system includes: mapping each of a plurality of mishandled utterances of the dialogue system to a vector space; clustering one or more subsets of the plurality of mishandled utterances based on identifying and grouping together mishandled utterances within a predefined radius of a centroid of a dense mass of mishandled utterances.

In one embodiment, the assessment of the one or more distinct corpora of dialogue data of the target dialog system includes: computing a density metric value for each of the one or more distinct corpora of mishandled utterances; evaluating the density metric for each respective one of the one or more distinct corpora of mishandled utterances against a density threshold; if the density metric value for the respective one of the one or more distinct corpora of mishandled utterances satisfies the density threshold, identifying the respective one as the suitable candidate for building a new dialogue competency for the target dialogue system of the subscriber.

In one embodiment, the density threshold relates to a minimum density value, if satisfied, indicates that a new competency can be defined or constructed based on mishandled utterance data within the respective one of the one or more distinct corpora of mishandled data.

In one embodiment, the assessment of the one or more distinct corpora of dialogue data of the target dialog system includes: computing a proximity metric value for each of the one or more distinct corpora of mishandled utterances; evaluating the proximity metric for each respective one of the one or more distinct corpora of mishandled utterances against a proximity threshold; if the proximity metric value for the respective one of the one or more distinct corpora of mishandled utterances satisfies or exceeds the proximity threshold, identifying the respective one as the suitable candidate for building a new dialogue competency for the target dialogue system of the subscriber.

In one embodiment, the proximity threshold relates to a minimum required distance between a target corpora of mishandled utterances and any cluster or corpus of utterance data associated with an existing dialogue competency of the target dialog system of the subscriber.

In one embodiment, building the one or more new dialogue competencies for the target dialogue system includes: setting one or more machine learning that are untrained for each of the one or more new dialogue competencies.

In one embodiment, the method includes constructing a corpus of training data for training one or more machine learning models defining a target new dialogue competency of the one or more new dialogue competencies of the target dialogue system, wherein constructing the corpus of training data includes sourcing training data from one or more distinct sources of machine learning training data based on attributes of mishandled utterance data within a target corpus of mishandled utterances of the one or more distinct corpora of mishandled utterances; and training the one or more machine learning models using training samples from the corpus of training data.

In one embodiment, once the one or more machine learning models are trained, each of the one or more new dialogue competencies of the target dialogue system performs one or more dialogue intent classification tasks using the one or more machine learning models for predicting one or more dialogue intents of a user involved in a conversation with an automated dialogue agent of the target dialogue system of the subscriber.

In one embodiment, configuring the dialogue system control structure of the target dialogue system of the subscriber includes: within a graphical representation of the dialogue system control structure, setting a plurality of distinct state nodes and setting each of a plurality of distinct edges between pairs of the plurality of distinct state nodes, wherein setting the plurality of distinct state nodes includes setting the one or more new dialogue competencies as one or more of the plurality of distinct state nodes.

In one embodiment, sourcing the training data includes: building a corpus of seed samples based on a sampling of the mishandled utterance data within of the target corpus of mishandled utterances of the one or more distinct corpora of mishandled utterances; and sourcing the training data from a remote crowdsourcing platform based on the corpus of seed samples.

In one embodiment, sourcing the training data includes: building a corpus of seed samples based on a sampling of the mishandled utterance data within of the target corpus of mishandled utterances of the one or more distinct corpora of mishandled utterances; and probing one or more internal data sources of the subscriber for the training data based using the corpus of seed samples.

In one embodiment, the method includes if the training data for training of the one or more machine learning models defining each of the one or more new dialogue competencies satisfy one or more efficacy threshold, deploying each of the one or more new dialog competencies in the target dialogue system.

In one embodiment, configuring the dialogue system control structure of the target dialogue system of the subscriber includes: setting an archetype that is selected from a plurality of distinct archetypes for each of the one or more new dialogue competencies of the target dialogue system based on attributes of mishandled utterance data within a target corpus of mishandled utterances of the one or more distinct corpora of mishandled utterances.

In one embodiment, the method includes responsive to an utterance input to the target dialogue system, of the subscriber implementing the automated dialogue agent of the target dialogue system of the subscriber using the dialogue system control structure to provide a successful response to the utterance input.

In one embodiment, the dialogue system control structure relates to a graphically-based structure that governs an operation and communication between multiple machine learning models and dialogue response generating components of the target dialogue system of the subscriber.

BRIEF DESCRIPTION OF THE FIGURES

FIG. 2 illustrates an example method in accordance with one or more embodiments of the present application;

FIG. 4 illustrates an example method for configuring a machine learning-based dialogue system in accordance with one or more embodiments of the present application;

DESCRIPTION OF THE PREFERRED EMBODIMENTS

Figure 1:
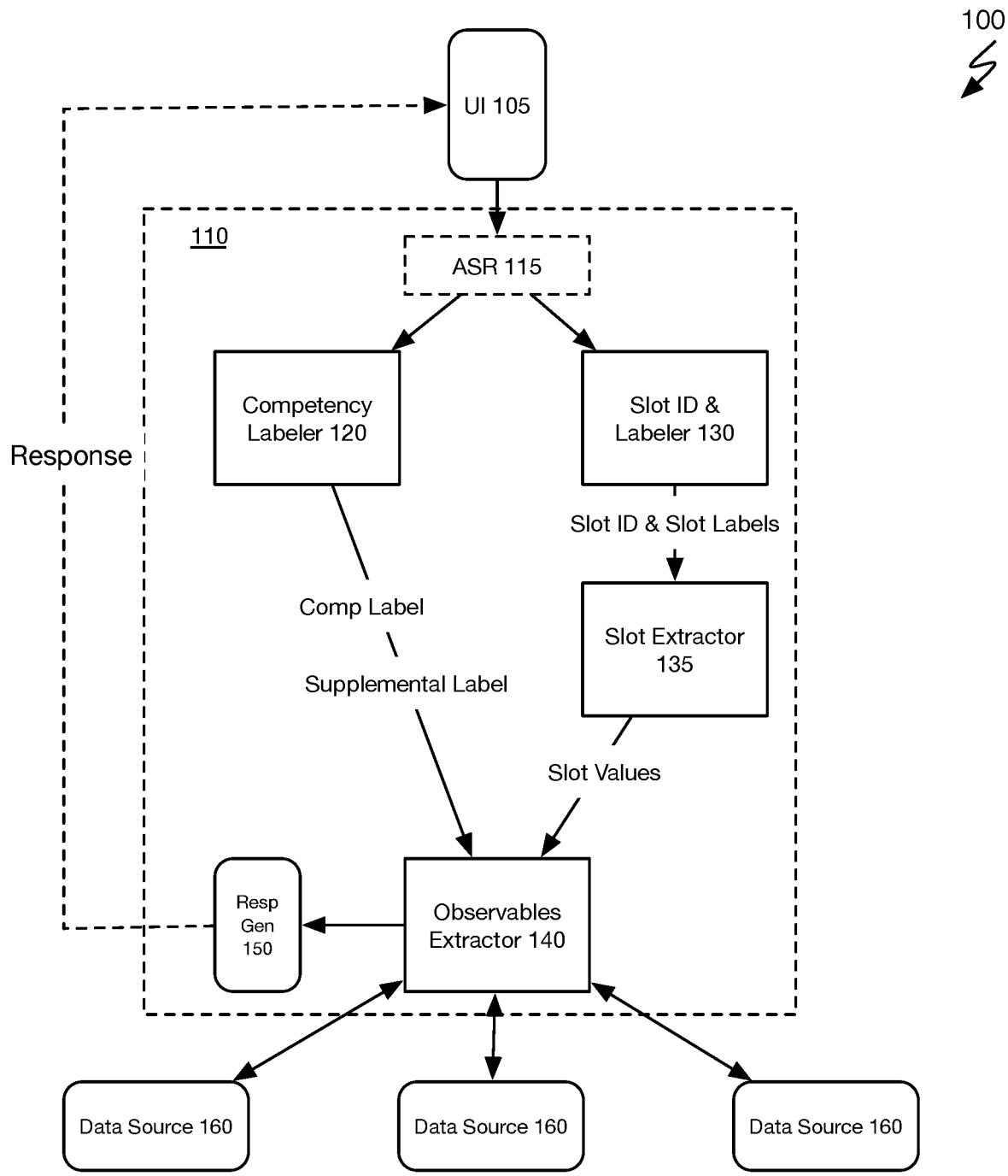
FIG. 1 illustrates a schematic representation of a system 100 in accordance with one or more embodiments of the present application.

The following description of the preferred embodiments of the present application are not intended to limit the inventions to these preferred embodiments, but rather to enable any person skilled in the art to make and use these inventions.

Overview

As discussed above, existing virtual assistant implementations do not have the requisite flexibility to address unrecognized queries or commands from user in which there are no predetermined rules designed around narrowly defined intents. This inflexible structure cannot reasonably and efficiently address the many variances in the manners in which a user may pose a query or command to the virtual assistant.

The embodiments of the present application, however, provide an artificially intelligent machine learning-based dialogue service and/or system with natural language processing capabilities that function to process and comprehend structured and/or unstructured natural language input from a user or input from any other suitable source and correspondingly provide highly conversant responses to dialogue inputs to the system. Using one or more trained (deep) machine learning models, such as long short-term memory (LSTM) neural network, the embodiments of the present application may function to understand any variety of natural language utterance or textual input provided to the system. The one or more deep machine learning models post deployment can continue to train using unknown and previously incomprehensible queries or commands from users. As a result, the underlying system that implements the (deep) machine learning models may function to evolve with increasing interactions with users and training rather than being governed by a fixed set of predetermined rules for responding to narrowly defined queries, as may be accomplished in the current state of the art.

Accordingly, the evolving nature of the artificial intelligence platform described herein therefore enables the artificially intelligent virtual assistant latitude to learn without a need for additional programming and the capabilities to ingest complex (or uncontemplated) utterances and text input to provide meaningful and accurate responses.

Additionally, one or more embodiments of the present application enable a configuration of an evolving and dynamic control structure that functions to govern an operation and communication between multiple machine learning models and dialogue response generating components of the machine learning-based dialogue system described throughout the present application.

Accordingly, a technical benefit of one or more of these embodiments include an intelligent control of a conversation and/or dialogue between a third-party and a dialogue agent implemented by the machine learning-based dialogue system described herein. Specifically, a graphical machine learning-based control network may function to enable a control of prose and content of a response by the machine-learning based dialogue system separate or independent from controlling a flow of conversation between a user and a dialogue agent of the dialogue system.

1. System for a Machine Learning-Based Dialogue System

As shown in FIG. 1, a system 100 that automatically trains and/or configures machine learning models includes an artificial intelligence (AI) virtual assistant platform 110 (e.g., artificially intelligent dialogue platform), a machine learning configuration interface 120, a training/configuration data repository 130, a configuration data queue 135, and a plurality of external training/configuration data sources 140. The system 100 in a preferred embodiment may function to deploy a remote machine learning-based dialogue service that enables subscribers to the service to implement and/or deploy a subscriber-specific conversational agent using one or more of the components (i.e., the service's technology stack) of the system 100.

Figure 1A:
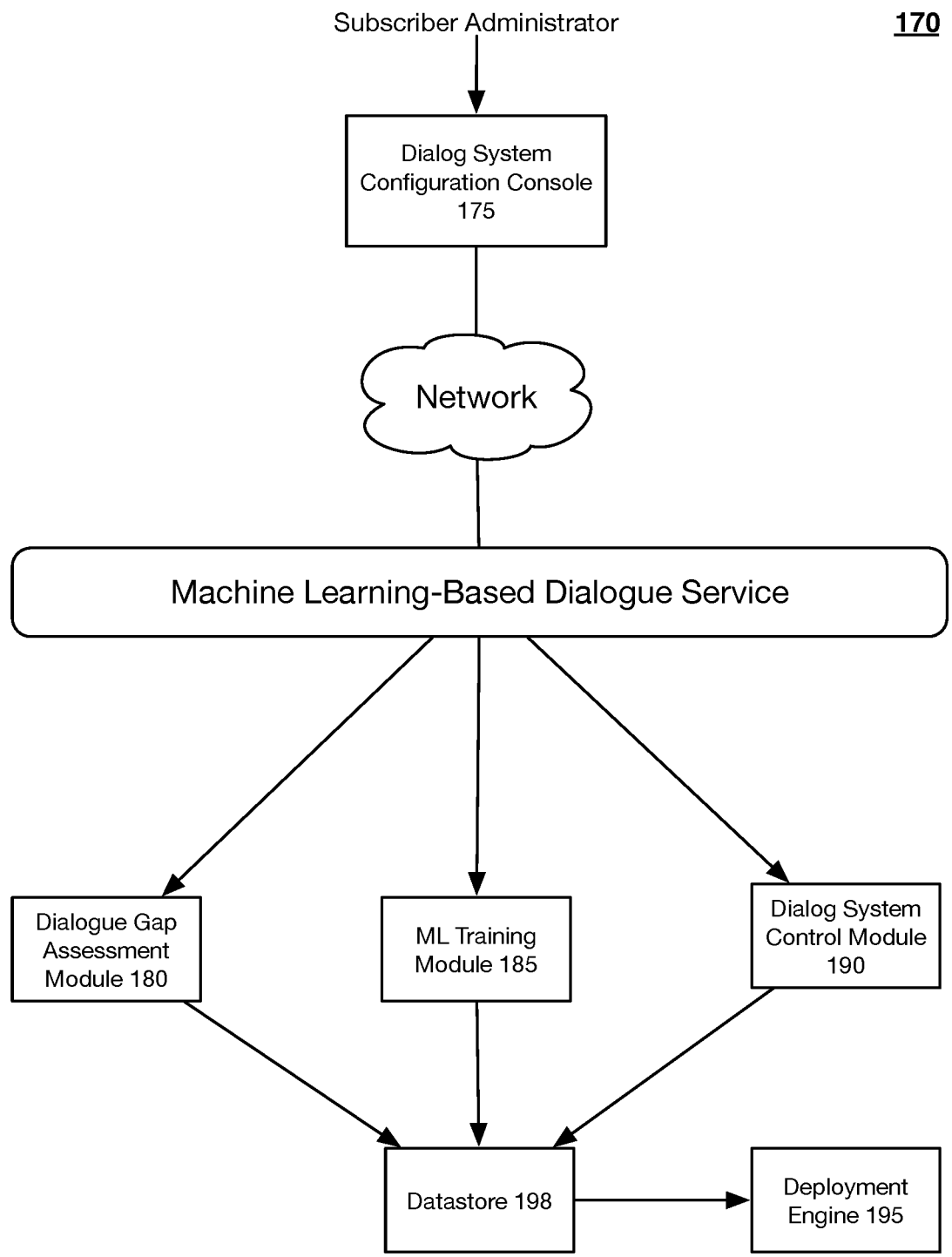
FIG. 1A illustrates a schematic representation of a subsystem of system 100 in accordance with one or more embodiments of the present application.
Figure 3:
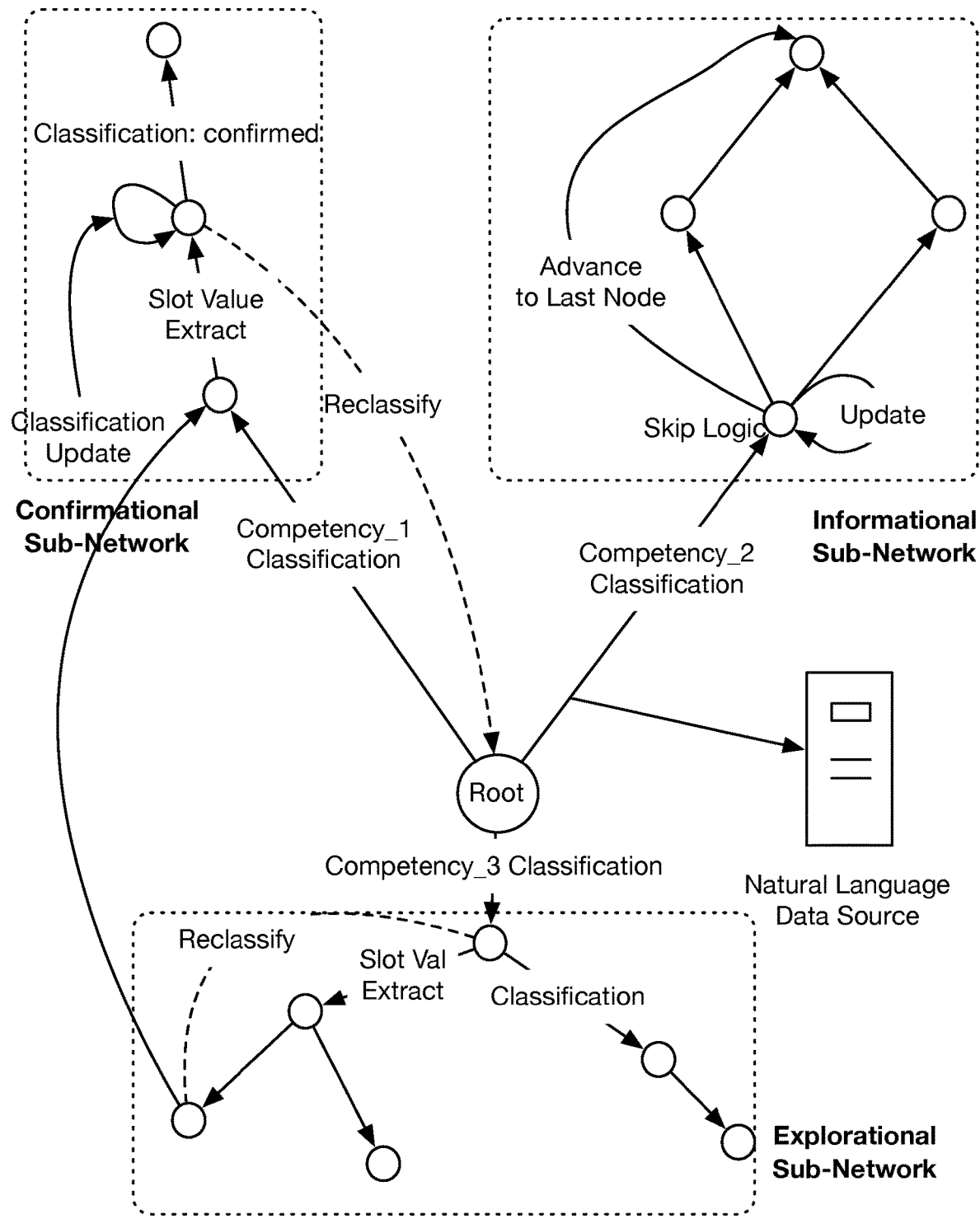
FIG. 3 illustrates a schematic representation of an example control network for controlling a machine learning-based dialogue system in accordance with one or more embodiments of the present application.

As shown in FIG. 1A, a subsystem 170 for intelligently configuring a machine learning-based dialogue system of a subscriber to a machine learning-based dialogue service includes a dialogue system configuration and management console 175, a dialogue gap assessment module 180, a machine learning training module 185, a dialogue system control module 190, a dialogue system deployment engine 195, and a datastore 198.

The dialogue system configuration and management console 175 preferably enables a remote user and/or administrator of a subscriber or the like to access, over a network (e.g., the Internet), one or more components and/or applications (including programs) of the system 100 for designing and/or configuring one or more aspects of a dialogue system of the subscriber. In one embodiment, the console 175 may include a subscriber (user) interface, such as a client browser or a client application, that enables a subscriber to interact with the one or more system or application components of the system 100. In some embodiments, the subscriber interface comprises a programmatic interface that may be implemented with one or more application programming interfaces that operable interact with and/or enable a configuration of any aspect or component of a machine learning-based automated dialogue system or the like. Additionally, or alternatively, the subscriber interface may include a graphical user interface (e.g., a web-based interface) or the like.

The dialogue gap assessment module 180 preferably enables a subscriber to perform an assessment of an existing dialogue system of the subscriber or of an intended dialogue system of the subscriber to determine gaps in dialogue capabilities and/or dialogue requirements/needs of the existing or intended dialogue system of the subscriber, as described in more detail below in the one or more methods disclosed herein.

The machine learning training module 185 of the subsystem 170 may function to enable a subscriber to configure one or more machine learning models for performing one or more dialogue handling-related tasks and/or source and configure training data sets for enabling the one or more machine learning models.

The dialogue system control module 190 preferably functions to enable a subscriber to create and/or configure a control structure for controlling/implementing a machine learning-based dialogue system of the subscriber. For instance, in one or more embodiments, the dialogue system control module 190 may enable a construction of a dialogue system control structure, that when executed, causes an implementation of an automated conversational agent of a dialogue system of a subscriber.

The dialogue system deployment engine 195 preferably functions to access one or more dialogue system configuration parameters of a dialogue system of a subscriber and implement an automated conversational agent along with the dialogue system of the subscriber. In some embodiments, the dialogue system configuration parameters may include one or more of a dialogue system control structure of a dialogue system of a subscriber, data sources of a subscriber (e.g., bank account data, patient health records, etc.), business logic for executing computations and/or user-specific data retrieval and/or transformations, training data corpora, and the like. In one embodiment, the one or more dialogue system configuration parameters may be stored in the datastore 198 in association with an account for the subscriber. Preferably, the datastore 198 enables the system 100 to host a plurality of distinct accounts for a plurality of distinct subscribers to the system/service 100.

It shall be noted that any module and/or system component herein including, but not limited to, the dialogue gap assessment module 175, the machine learning training module 180, the dialogue system control module 185, and/or the like may be executed by a distributed one or more computers, one or more computing servers, one or more computer processors implemented by the system 100. Additionally, or alternatively, any or each of the modules described herein may be executed by one or more processors, one or more computers, and/or by a distributed computing system or the like.

Generally, the system 100 functions to implement the artificial intelligence virtual assistant platform 110 to enable intelligent and conversational responses by an artificially intelligent virtual assistant to a user query and/or user command input into the system 100, as described in U.S. patent application No. 15,797,414 and U.S. patent application No. 15,821,010, which are both incorporated herein in their entireties by this reference. Specifically, the system 100 functions to ingest user input in the form of text or speech into a user interface 160. At natural language processing components of the system 100 that may include, at least, the competency classification engine 120 the slot identification engine 130, and a slot value extractor 135, the system 100 functions to identify a competency classification label for the user input data and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform 110 functions to implement an artificially intelligent virtual assistant capable of interacting and communication with a user. The artificial intelligence platform 110 may be implemented via one or more specifically configured web or private computing servers (or a distributed computing system; e.g., the cloud) or any suitable system for implementing the system 100 and/or the method 200.

In some implementations, the artificial intelligence virtual assistant platform 110 may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform 110. Thus, the AI virtual assistant platform 110 may work in conjunction with the service provider to attend to the one or more queries and/or commands of the users of the service provider. In this implementation, the data sources 160 may be data sources of the service provider that are external data sources to the AI virtual assistant platform 110.

The competency classification engine 120 together with the slot identification engine 130 and the slot value extractor 135 preferably function to define a natural language processing (NLP) component of the artificial intelligence platform 110. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowd-sourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were miss-predicted or incorrectly analyzed by the system 100 including the competency classification engine 120.

The competency classification engine 120 may additionally be configured to generate or identify one competency classification label for each user query and/or user command input into the engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configured to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three machine learning algorithms from a total of nine machine learning algorithms or the like) of the ensemble of machine learning algorithms to generate a competency classification label.

Additionally, the competency classification engine 120 may be implemented by the one or more computing servers, computer processors, and the like of the artificial intelligence virtual assistance platform 110.

The slot identification engine 130 functions to implement one or more machine learning models to identify slots or meaningful segments of user queries or user commands and to assign a slot classification label for each identified slot. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command) that may include one or more data elements (e.g., terms, values, characters, media, etc.). Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 120 may implement a single deep machine learning algorithm or an ensemble of deep machine learning algorithms. Additionally, the slot identification engine 130 may be implemented by the one or more computing servers, computer processors, and the like of the artificial intelligence virtual assistance platform 110.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the artificially intelligent virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 500 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instance, the one or more slot values may function to narrow the pool of response template selectable by the response generator to a subset of a larger pool of response templates to consider the variations in a query or user command identified in the slot values. The response templates may generally a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workbots, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

2. Method for Intelligently Configuring and Implementing a Machine Learning-Based Control Structure of a Machine Learning-Based Dialogue System As shown in FIG. 2, a method 200 for constructing and deploying a graphical machine learning classification control network for an artificially intelligent dialogue system includes configuring a root node S210, configuring one or more state nodes S220, configuring a plurality of graphical connections (graphical edges) between nodes S230, deploying the graphical machine learning classification control network in a live artificially intelligent dialogue system S240. Optionally, configuring logic operations within the graphical machine learning classification control network S235.

Generally, the method 200 may function to enable a configuration or construction of conversational system control flow for a machine learning-based dialogue system. The conversational system control flow may include an identification of a plurality of machine learning classifiers networked and/or mapped together with graphical edges and/or transitions for executing logic and variable dialogue data. Because the method 200 enables intelligent construction of a conversation system control flow, a system (e.g., system 100) implementing the method 200 may function to intuitively guide dialogue between a user and a virtual dialogue agent in a highly conversational, uninterrupted, and intelligent manner while resolving an underlying purpose of the dialogue.

S210, which includes configuring a root node, preferably includes setting or positioning a graphical representation of a root classification node in a control structure and configuring one or more operations of the root classification node within a graphical machine learning classification control network. The root classification node preferably functions as an initial competency or intent classifier of conversational data obtained from a user interfacing with a dialogue system implementing the method 200. That is, at an outset (e.g., application initialization, etc.) of a conversational interaction between a user and a dialogue system implementing the method 200, the root classification node operates to receive conversational data or input (e.g., verbal input, textual input, etc.) and responsively, generates a competency classification (label) or intent classification (label) based on the conversational data or input and correspondingly, direct the conversation between the user and the dialogue system to a sub-network of state classification nodes or a single state classification node (as discussed in more detail below) that is able to handle the conversation based on the competency classification label.

Additionally, or alternatively, the root classification node may operate to re-classify an ongoing or present conversation between a user and a dialogue system implementing the method 200 based on additional or subsequent conversational data obtained from the user. That is, in some embodiments, S210 may function to use the root classification node to generate a secondary or subsequent competency classification label midstream a conversation between a user and a dialogue agent and/or the like. In such embodiments, S210 may function to implement the root classification node to generate a second distinct competency classification label that operates to move a conversation between a user and a dialogue agent from a first sub-network of state nodes associated with a first competency classification label to a second sub-network of state nodes associated with the second or subsequent competency classification label generated by the root classification node. Effectively, a reclassification by the root classification node may be triggered by an inability of a sub-network of state nodes associated with an initial competency classification label to handle or generate a proper response to conversational data or otherwise, if a trajectory of a conversation between the user and a dialogue agent changes towards a different competency or topic of conversation. Additionally, it shall be noted that root node may function to support competency and/or intent classification of conversational input data from any state, including but not limited to, at a completion of a conversation on a topic or competency, a change of topic and/or a conversation between multiple competencies, and/or the like.

In a preferred embodiment, one or more competency and/or intent classification capabilities of the root classification node are enabled using one or more machine learning classifiers. In one implementation, the root classification node may be implemented by and/or expressly configured with an ensemble of machine learning classifiers capable of returning one or more distinct machine learning (competency) classification labels based on (vector) features (e.g., conversational data) extracted from conversational input of a user to a dialogue system implementing the method 200.

In this implementation, the ensemble of machine learning classifiers may include a plurality of distinct machine learning classifiers working in concert or independently to generate competency classification labels for given conversational data input. For instance, the ensemble of machine learning classifiers may include five distinctly trained machine learning classifiers in which each of the five machine learning classifiers defining the ensemble may be specifically trained to classify conversational data for a single competency or intent classification label and correspondingly, generate the distinct competency or intent classification label. It shall be noted that the ensemble of machine learning classifiers may include any number of machine learning classifiers capable of returning or generating any number of machine learning classification labels based on input of conversational data.

In another implementation, the root classification node may be implemented by and/or expressly configured with a single combinational machine learning classifier that is trained to return or generate one of a plurality of distinct competency or intent classification labels based on features extracted from conversational input of a user to a dialogue system implementing the method 200. That is, the single combination machine learning classifier may be specifically trained to detect all or any type of competency or intent that is comprehensible by a dialogue system. For example, the single combinational machine learning classifier may be trained and/or configured to detect five distinct competencies and/or distinct intents of a user based on input of conversational data. In such example, the single combinational machine learning classifier may function to output a single competency classification label selected from a plurality of distinct competency labels for which the single combination machine learning classifier is trained. Additionally, or alternatively, the single combinational machine learning classifier may function to output multiple distinct competency classification labels together with a probability of match of competency or classification intent for each of the multiple distinct competency classification labels that is output.

Additionally, S210 may function to configure the root classification node to extend to a plurality of distinct state classification nodes and/or sub-networks of state classification nodes. That is, in some embodiments, S210 may function to communicatively connect the root classification node to each of a plurality of distinct state classification nodes and/or sub-networks of state classification nodes. In this way, the root classification node may function to drive or guide a conversation between a user and a dialogue system implementing the method 200 by directing conversational input data along a connection or a path to a respective state classification node and/or sub-network of state classification nodes based on a competency classification and/or intent classification label generated at the root classification node. That is, the competency classification or intent classification label produced at the root classification node may preferably be used to govern a conversational direction along one or more available communication paths within the graphical machine learning classification control network.

It shall be noted that any suitable and/or state node described herein may be additionally or alternatively configured in a similar manner as a root classification node with single machine learning model with a combination of machine learning models, such as ensemble of machine learning models, acting in concert to classification data based on conversational input data from a user.

S220, which includes configuring state nodes, preferably includes defining and/or constructing one or more state classification nodes in a dialogue system control structure and configuring one or more operations of the one or more state classification nodes within a graphical machine learning classification control network.

Preferably, each of the one or more state classification nodes is configured to perform a distinct classification task based on conversational data input. That is, in a preferred embodiment, each of the one or more state classification nodes may function to implement or be operated with one or more distinctly trained machine learning classifier. Accordingly, depending on a conversational flow between a user and a dialogue system implementing the method 200, S220 may function to implement and/or operate one or more of the state classification nodes to generate one or more machine learning classification labels based on conversational data input obtained or derived from a conversation involving a user.

In some embodiments, a single state classification node may be implemented with or used to operate a single machine learning classifier. In another embodiment, a single state classification node may be implemented with or used to operate a plurality and/or an ensemble of machine learning classifiers. In an implementation in which a state classification node is implemented with or used to operate a plurality of distinct machine learning classifiers, the state classification node may function to generate a plurality of distinct machine learning classification labels using the plurality of distinct machine learning classifiers responsive to conversational data input.

In a preferred embodiment, S220 may function to configure one or more distinct networks of distinct state classification nodes. In such embodiment, a single network of state classification nodes preferably includes two or more distinct state classification nodes that are configured to be in operational communication. The network of state classification nodes may function to classify conversation data according to a distinct conversational competency of a dialogue system implementing the method 200. Accordingly, S220 may function to configure a plurality of distinct networks of state classification nodes in which each of the plurality of distinct state classification nodes is configured to perform classification tasks according to one distinct competency of a dialogue system implementing the method 200.

Additionally, or alternatively, each distinct network of state classification nodes may extend from the root classification node. That is, each distinct network of state classification nodes may have a direct communication path from the root classification node. In some embodiments, a distinct network of state classification nodes may be activated or placed into classification operation based on receiving a competency classification label, conversational data, and/or an activation signal from the root classification node via the communication path. In such embodiments, other distinct competency classification nodes of a dialogue system implementing the method 200 may remain in a dormant and/or an inactive state. In operation, a dialogue system implementing the method 200 preferably functions to operate or activate a single network of state classification nodes at a time; however, it shall be noted that in the circumstance a conversation flow between a dialogue agent or the like of the dialogue system involves more than one competency or intent, the dialogue system may function to operate multiple distinct networks of state classification nodes in parallel.

In a preferred conversation flow, a network (or sub-network) of state classification nodes may be placed into operation based on root input from a root classification node. Alternatively, in some embodiment, a network of state classification nodes may be placed into operation based on input from a lateral or distinct network of state classification node of a dialogue system implementing the method 200. In such embodiments, a first network of state classification nodes tasked by the root classification node with handling a conversational flow between a user and a dialogue agent may function to pass conversational and/or classification data laterally to a second distinct network of state classification nodes that may be better suited to handle conversational data from a user.

In a preferred embodiment, each of networks of a dialogue system may be configured according to one of a plurality of distinct conversational archetypes. For instance, in some embodiments, S220 may function to set or configured each network of state classification nodes as an informational archetype, a confirmational archetype, or an explorational archetype. Each distinct archetype may be designed or configured to achieve a different conversational objective of a dialogue system.

As an example, S220 may function to configure a network of state classification nodes according to the informational archetype. Accordingly, a conversational objective of the network of state classification nodes when configured according to an informational archetype may include providing information or other data in a conversational response by a dialogue system responsive to one or more queries and/or commands from a user. In such embodiments, one or more of the state classification nodes that may be configured according to the informational archetype may be mapped to one or more data sources that enables the one or more state classification nodes to handle a user query and/or user command for information.

As another example, S220 may function to configure a network of state classification nodes according to the confirmational (executional) archetype. Accordingly, a conversational objective of the network of state classification nodes when configured as a confirmational archetype may include executing one or more actions against an account associated with a user or executing some action against some data source based on conversation input from a user. In such embodiments, one or more of the state classification nodes that may be configured according to the confirmational archetype may be configured with executional authorities that enables one or more of the state classification nodes to create an account and/or execute some action against some data source based on conversational input from a user.

As another example, S220 may function to configure a network of state classification nodes according to the explorational (executional) archetype. Accordingly, a conversational objective of the network of state classification nodes when configured as an explorational archetype may include enabling a user to explore a variety of related competencies and/or topics, preferably associated with a sub-network of nodes) in an effort to provide a tailored and/or pointed response for resolving a user query, user command, and/or the like associated with conversational input from the user.

S230, which includes configuring a plurality of (graphical) connections (graphical edges) between and/or to state nodes, may function to configure and/or build operational connections between and/or to state classification nodes that define one or more operations or actions computed between and/or to state classification nodes in the graphical machine learning classification control network. That is, in a preferred implementation in which the machine learning classification control network is illustrated with a graphical representation, the plurality of connections may each be represented as graphical edges and/or graphical transitions between state nodes or a graphical transition that loops back into a given state node.

Preferably, S230 includes identifying and/or building each of the plurality of connections as one or more of a classification transition, a slot transition, an update transition, and/or the like.

A classification transition (or edge) preferably relates to a transition between at least a pair of state nodes that denotes that a machine learning classification label was generated by a first state node or originating node which may be passed to a second state node as an input or the like. The classification transition may typically be represented as a graphical arrow or line extending from a first state node to a second state node within the graphical machine learning classification control network. The graphical representation of the classification transition may additionally or alternatively include annotations that describe an operation of the classification transition.

A slot transition (or edge) preferably relates to a transition between at least a pair of state nodes that denotes that one or more slot values may have been extracted from conversational data generated based on user input (e.g., a user query, user command, etc.). The slot transition may typically be represented as a graphical arrow or line extending from a first state node to a second state node within the graphical machine learning classification control network. The graphical representation of the slot transition may additionally or alternatively include annotations that describe an operation of the slot transition.

An update transition includes a specific type of classification transition in which the transition connects a pair of state nodes that are both the same state node. That is, in one or more embodiments, an update transition (or edge) preferably relates to a transition that begins at a given state node and reverts back to the state node for purposes of acquiring additional information from a user interacting with the dialogue system implementing the method 200. Accordingly, an update transition in some embodiments denotes an action by the dialogue system to obtain additional information from a user, which may include posing a query by a dialogue agent to a user for purposes of collecting additionally required conversational data (e.g., collecting additional slot values) for executing some action by the dialogue system. The update transition may typically be represented as a graphical loop that originates and reverts back to a state node within the graphical machine learning classification control network. The graphical representation of the update transition may additionally or alternatively include annotations that describe an operation of the update transition.

It shall be noted that while S230 may function to configure the one or more transitions of a machine learning classification control network as one or more a classification transition, a slot transition, and/or an update transition, the method 200 may function to implement any suitable and/or type of transition between and/or to state nodes within the control network. For instance, S230 may additionally configure one or more of the transitions of the control network to include re-classifying transitions that operate to revert or move conversational data out of a network of state classification nodes to the root classification node in order to re-classify the conversational data to another competency or the like. In another example, S230 may function to configure one or more of the transition of the control network to include multi-hop transitions which may function to skip one or more state nodes of an ordered conversational flow of the control network. That is, in some embodiments, based on conversational data and the one or more operations performed at a state node, a multi-hop transition may be triggered that enables the conversational data and/or conversational flow to skip one or more (intermediate) downstream nodes to another state node because one or more operations of the one or more (intermediate) downstream nodes may have been satisfied prematurely at an upstream or prior state node.

Optionally, S235, which includes configuring logic transitions (e.g., business logic transitions), may function to configure or build one or more logic transitions between two or more state nodes of the machine learning classification control network. The one or more logic transitions may include any suitable, business, or other useful heuristic that enables and/or adds efficiency to a conversational flow between a user and a dialogue system implementing the method 200 and enables an execution or completion of one or more business tasks for responding to conversational input from the user.

In one example, S235 may configure one or more logic transitions that enable a conversational flow to move or jump to disparate (unconnected) sections of a network of state classification nodes, such that even if there is no recognized transition between two state nodes or two distinct networks of state classification nodes, the logic transition when executed can move the conversational flow to a second of the two state nodes or the two distinct networks. In another example, S235 may configure one or more logic transitions that enable the control network to interface with one or more external systems, external data sources, external resources, and/or the like. For instance, the logic transitions may function to execute application programming interface (API) calls for obtaining data and/or the like from an external or remote resource.

S240, deploying the graphical machine learning classification control network in a live artificially intelligent dialogue system, may function to implement the graphical machine learning control network as a primary operational control structure for implementing a live conversation between one or more users and a virtual (digital) dialogue agent of a dialogue system implementing the method 200. That is, the graphical machine learning classification control network may function to operate as a de facto brain of an artificially intelligent dialogue agent of the dialogue system. For instance, in a preferred embodiment, the dialogue system using or implementing the graphical machine learning classification control network may function to references one or more constructs and/or features of the control network to conduct and/or handle one or more live conversations between real-world users and a virtual dialogue agent of the dialogue system. Accordingly, the graphical machine learning classification control network may be used to conduct a live conversation with a user until a disposition, completion, and/or termination of the conversation between the user and a virtual dialogue agent.

3. Method(s) for Intelligently Configuring & Implementing a Machine Learning-Based Dialogue System As shown in FIG. 4, a method 400 for intelligently configuring and deploying a machine learning-based dialogue system includes implementing a conversational deficiency assessment of a subscriber system S410, identifying one or more competency development opportunities S420, sourcing training data and configuring a training corpus S430, configuring a dialogue system control structure S440, and training one or more nodes of a dialogue system control structure S450.

3.1 Dialogue System Gap Assessment & Dialog Data Collection

Figure 5:
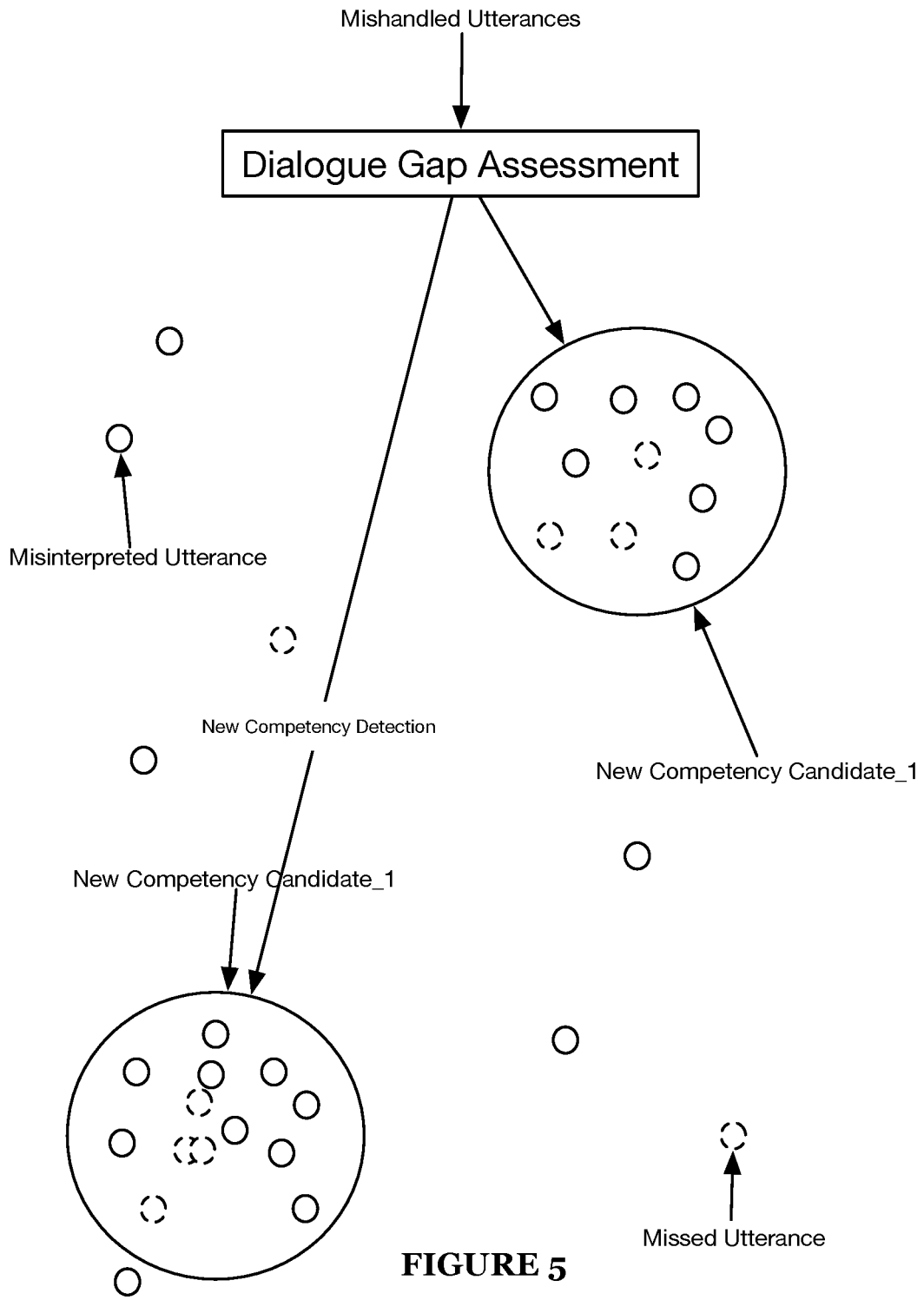
FIG. 5 illustrates a schematic representation of an identification of new dialogue competencies in accordance with one or more embodiments of the present application.

S410, which includes implementing a conversational deficiency assessment of a subscriber system, may function to intelligently assess and/or identify dialog competencies and/or dialog capabilities that are lacking and/or insufficiently developed in an existing and/or impending automated dialog system of a subscriber to the machine learning-based dialogue service, as shown by way of example in FIG. 5. A subscriber as referred to herein may include any suitable remote entity having a subscription and/or an account hosted with the machine learning-based dialogue service. Via the subscription, a subscriber may have access to one or more services of the machine learning-based dialogue service for creating and/or implementing a machine learning-based dialogue agent and/or system.

In a first implementation, when applied to an existing dialogue system of a subscriber, S410 may function to evaluate the one or more existing dialog competencies of the existing dialog system of the subscriber. In this first implementation, S410 which includes S412, may function to obtain access to and/or collect one or more corpora of dialog data from one or more dialog data sources associated with the existing dialog system of the subscriber. For instance, S412 may function to source dialog data from one or more of production logs of a deployed dialog system and/or a virtual dialog agent of the subscriber, datastores storing records (e.g., call or contact center logs) and/or dialog data associated with historical dialogs between a human agent and/or a virtual agent of the subscriber and a human user or a human customer, and the like. Additionally, as described in more details below, dialog data and/or the like may be sourced from human agents and/or internal employees of a subscriber via internal crowdsourcing. It shall be noted that S412 may function source and/or access dialog data from any suitable dialog data source associated with the subscriber, which may include on-premise data sources and/or remote data sources.

Additionally, or alternatively, implementing the conversational deficiency assessment in this first implementation, S410 which includes S414, may function to apply one or more analysis techniques to the one or more corpora of dialogue data to identify one or more gaps or deficiencies in the dialog system of the subscriber. That is, in a preferred embodiment, S414 may function to identify one or more groupings of user queries and/or human utterances derived from the dialog data of the subscriber that may include groupings of misinterpreted or incorrectly answered queries or utterances, missed or unanswered queries or utterances, and the like. Accordingly, S414 may function to identify one or more distinct corpora of mishandled utterances based on an analysis of the one or more corpora of dialogue data.

Preferably, a grouping of misinterpreted queries and/or utterances (e.g., mishandled utterances/mishandled queries) includes queries and/or utterances posed to a dialog system of a subscriber for which a response was provided by the dialog system, however, the response provided by the dialog system to the utterance either failed to address or properly respond to the actual intent of the utterance based on a misunderstanding or a miscomputation of the intent of the utterance. That is, the dialog system of the subscriber may have applied an existing but incorrect competency of the dialog system in a failed attempt to accurately respond to a user's query or utterance. Thus, a grouping of misinterpreted queries includes those queries of the dialog data having a misalignment of an applied existing competency of the dialog system and an actual intent of the query or utterance.

Preferably, a grouping of missed queries and/or utterances includes queries and/or utterances posted to a dialog system of a subscriber for which a response addressing an intent of the query or the utterance was not made by the dialog system. That is, the dialog system of the subscriber may fail to respond to the query or utterance or provide a default response or an action in the circumstance that the dialog system cannot identify or interpret an intent of the query or utterance and therefore, may be unable to match or apply an existing competency of the dialog system to the intent of the query or utterance. Accordingly, a missed query and/or a missed utterance preferably include those queries and/or utterances outside of the scope of an aptitude and/or query or intent handling skillset of the dialog system.

Additionally, or alternatively, the applied one or more analysis techniques to the one or more corpora of dialogue data may include a clustering analysis technique. For instance, S410 (similarly S414) may function to implement any suitable clustering and/or grouping technique and preferably, may function to apply one or more of the cluster/grouping techniques within a dataset to identify good (e.g., useful data for training) and bad data (e.g., training data or other data that reduces a quality of a model or classifier, etc.), as disclosed in U.S. Provisional Application No. 62/829,289, which is incorporated herein in its entirety by this reference. Accordingly, in one embodiment, S414 may function to apply at least an initial clustering analysis technique to the entirety of the dialog data of subscriber to identify one or more clusters and/or groupings of utterances and/or queries. Preferably, S414 may function to define and/or identify clusters or groupings of dialog data having utterances and/or queries that are similar in meaning, scope, and/or similar in intent. In this application of the clustering analysis technique, S414 may function to coarsely identify broad groupings or broad archetypes of utterances and/or queries including, but not limited to, a grouping of utterances/queries that were correctly handled, a distinct grouping of utterances/queries that were misinterpreted (as described above), a further distinct grouping of utterances/queries that were missed by the dialog system (as described above).

In one or more embodiments, S414 may function to additionally apply the clustering analysis technique to one or more subsets of the dialog data including one or more of the distinct broad groupings or broad archetypes of utterances. For instance, S414 may function to apply the clustering analysis technique to a first subset of the dialog data including a grouping of missed utterances and/or queries and a second distinct subset of the dialog data that includes a grouping of misinterpreted utterances and/or queries. In such preferred embodiment, for each of the respective subsets of the dialog data, S414 may function to further perform a cluster analysis of the query and/or utterance data within the subset to identify one or more sub-groupings/sub-clusters of utterance and/or query data. For example, in a cluster analysis of a subset of dialog data having misinterpreted utterances and/or queries, S414 may function to cluster together a plurality of sub-grouping based on identifying and clustering together utterances and/or queries that may have a similar or a same intent and/or that may be similar in dialog scope.

Thus, as a result of the further cluster analysis of the coarse groupings of dialog data (e.g., missed and/or misinterpreted dialog data) that may have been mishandled by the dialog system of the subscriber, S414 may function to identify granular subsets of dialog data that include distinct groupings of mishandled utterances and/or queries having a same or similar intent (i.e., intent-based grouping of mishandled utterances) or having a same or similar scope (i.e., scope-based grouping of mishandled utterances).

In a second implementation, when applied to a new or an intended dialogue system of a subscriber, S410 may function to identify one or more prospective competencies for a new machine learning-based dialog system based on one or more dialog data logs and/or datastores of customer utterances and/or queries to one or more systems and/or agents of a subscriber.

3.2 Competency Identification & Competency Building

S420, which includes identifying one or more competency development opportunities, may function to identify one or more new dialog capabilities and/or new dialog skillsets (e.g., new/emerging dialog competencies) for a dialogue system of a subscriber based on a conversational deficiency assessment of a dialog system of the subscriber. Additionally, or alternatively, S420 may function to identify one or more dialog system improvement opportunities to improve existing dialog capabilities and/or dialog skillsets (e.g., dialog competencies) of a dialog system of a subscriber based on the conversational deficiency assessment.

Accordingly, for each cluster and/or grouping of utterance data (identified in S410), S420 may function to determine whether each respective cluster and/or grouping of utterance data of a subscriber includes an area of aptitude to be developed as a new dialog competency and/or an improved dialog competency for a dialog system of a subscriber based on an assessment of the clusters and/or groupings of utterances.

In one embodiment, S420 may function to identify whether utterance collisions exist between one or more of the clusters and/or groupings of utterance data and one or more corpus of utterance data of an existing competency of a dialog system of a subscriber. A collision, as referred to herein, preferably relates to an overlap that occurs between an utterance found in the clusters and/or groupings of mishandled utterances (from S410) and one or more utterances of a corpus of utterance data for an existing competency of a subscriber's dialog system. For instance, the corpus of utterance data for the existing competency may include a training data corpus, a testing data corpus, and/or the like that may be used to develop and/or train an existing competency of a dialog system of a subscriber.

A collision between utterances may be direct or indirect. A direct collision may include instances of overlap between an utterance in the clusters or groupings of mishandled utterances that may be the same in wording and/or sentence structure as an utterance in a corpus of utterance data of an existing competency of the dialog system of the subscriber. For instance, a query such as "what is my balance" may exist in a duster of mishandled utterances and in a corpus of training data for an existing competency of a dialog system of a subscriber thereby causing a direct collision.

An indirect collision between utterances may include instances of overlap between an utterance in the cluster or groupings of mishandled utterances that may be similar in meaning or scope event through a wording or sentence structure of the utterances are distinct. For instance, a query such as "what is the balance in my account" may exist in a cluster of mishandled utterances that may have a same or similar meaning as "how much money do I have in my account" which may be an utterance in a corpus of training data for an existing competency of a dialog system of a subscriber.

In the circumstance that S420 identifies a direct or an indirect collision between utterances, S420 may function to identify the existing competency of the dialog system of the subscriber having the utterance collision as a deficient or degraded competency for which improved configuration and/or training for the competency may be required.

In some embodiments, the assessment in S420 of the clusters and/or groupings of utterances includes evaluating each of the clusters and/or groupings of mishandled utterances against one or more predetermined and/or one or more dynamic thresholds to determine whether or not a new dialog competency may be generated or constructed for a dialog system of a subscriber. The one or more predetermined and/or one or more dynamic thresholds may relate to one or more a density of a cluster, a proximity of a cluster, and/or the like.

For instance, S420 may function to assess each of the one or more clusters of mishandled utterances against a density threshold. A density threshold preferably relates to a minimum density value (i.e., minimum quantity of utterances in a group or cluster), if satisfied, may indicate that a new competency may be defined and/or constructed based on the utterance data within a subject cluster or grouping of mishandled utterances. The minimum density value may relate to a minimum number and amount of utterance data (i.e., number of distinct utterances) required within a target cluster or a target grouping.

Accordingly, S420 may function to compare a duster of mishandled utterance data to a density threshold to identify a suitable cluster for developing a new competency. If a density of a duster satisfies (i.e., meets or exceeds) a density threshold, S420 may function indicate and/or identify the cluster as a suitable candidate for building a new competency for an existing dialog system of a subscriber. Alternatively, if a density of a target duster does not satisfy a density threshold, S420 may function to discard the target duster as unsuitable for developing a new competency. However, in some embodiments, if a cluster fails a density threshold, S420 may identify an existing competency of the dialog system of the subscriber for retraining with utterance data from the target cluster (e.g., the failed duster, the unsuitable candidate, etc.).

Additionally, or alternatively, S420 may function to assess a target cluster of mishandled utterance data against a proximity metric or threshold. A proximity threshold preferably relates to a minimum required distance between a target cluster of mishandled utterance data and any cluster and/or corpus of utterance data associated with an existing competency of a dialog system of a subscriber. That is, in some embodiments, S420 may function to map each target cluster of mishandled utterance data relative to dusters of utterance data for each of a plurality of existing competencies of a dialog system. In such embodiments, S420 may function to measure a distance a target cluster and each of duster of the plurality of existing competencies. The distance measure may be between the centroids of the compared dusters; alternatively, the distance measure may be between the most proximate points from each of a target cluster and a cluster of an existing competency.

Accordingly, in one or more embodiments, if a target duster exceeds a proximity threshold, S420 may function to designate the target cluster as a potentially unsuitable candidate for constructing a new competency for the dialog system. In such instances, the target cluster may be mapped at a distance that is considered too far to be reasonably related to the existing competencies of the dialog system. That is, the target cluster may include utterance data that may not be related to a broader domain of a plurality of distinct competencies of a dialog system. For instance, a target cluster may relate to a sports-related utterance whereas the clusters associated with competencies of a dialog system may related to patient health-relate utterances.

In yet one or more further embodiments, the proximity threshold may additionally or alternatively relate to a minimum distance between a target cluster of mishandled utterance data and any cluster and/or corpus of utterance data associated with an existing competency of a dialog system of a subscriber. In such embodiments, if in S420 it is determined that a distance between a target duster and a cluster of a competency are sufficiently close, such that a measured distance between them is below the minimum distance requirement of the proximity threshold, S420 may function to identify the target cluster as an unsuitable candidate for a new competency and/or as a suitable duster of utterance data for enhanced or new training of an existing competency (most likely the competency that is in most proximate distance to the target cluster).

It shall be noted that any suitable threshold or competency candidate assessment metric may be used in identifying suitable candidates of clusters and/or groupings of mishandled utterance data for new dialogue competencies may be implemented. For instance, in some embodiments, an assessment of the one or more distinct corpora of mishandled utterance data may be bounded by a combination of a density threshold and a proximity threshold, such that both thresholds must be satisfied to trigger an indication or otherwise, identify a cluster or grouping of mishandled utterance data as a suitable candidate for constructing a new dialogue competency for a dialogue system of a subscriber.

3.3 Crowdsourcing Training Data & Training Corpus Formation

S430, which includes sourcing training data, may function to source training data and configure a training corpus that includes training data for building a new competency for a dialogue system. In one or more embodiments, S430 may function to source training data from one or more distinct sources of training data that may be used for training each of the newly identified competencies of the dialogue system of the subscriber. In such embodiments, the one or more sources of training data may include one or more internal sources of training data and/or one or more external sources of training data.

In a preferred embodiment, S430 may function to implement an intelligent machine learning training system, as described in U.S. Pat. No. 10,296,848, which is incorporated herein in its entirety by this reference. Additionally, or alternatively, S430 may function to intelligently source and curate training data for training one or more competency of a dialogue system, as described in U.S. Pat. No. 10,303,978, which is incorporated herein in its entirety by this reference.

In some embodiments, using at least the intelligent machine learning training system, S430 may function to automate a sourcing of training data with one or more crowdsourcing and training data generation techniques. For instance, in some implementations, S430 may function to enable an external crowdsourcing of training data from one or more remote or external crowdsourcing platforms or the like. In such circumstances, S430 preferably functions to build a corpus of seed samples from a cluster and/or a grouping of mishandled utterances for a target newly identified competency. Each seed sample of the corpus preferably relates to and/or includes one of the mishandled utterances. S430 may function to provide or transmit the corpus of seed samples to each of one or more distinct remote crowdsourcing platforms, which may then use the seed samples from the corpus as the basis for generating like but distinct utterances as additional training data for training the target newly identified competency. That is, each seed sample from the corpus may be proliferated at the remote crowdsourcing platform to create a larger body of training samples sufficient for training one or more machine learning models that define a newly defined target competency. Accordingly, S430 may function to receive one or more corpora of machine learning training data from each of the one or more distinct remote crowdsourcing data sources. Preferably, each of the one or more corpora of machine learning training data includes a plurality of labeled training samples.

In another example, in some implementations, S430 may function to enable an internal crowdsourcing of training data from one or more internal sources of the subscriber to the service. Accordingly, S430 may function to use the intelligent machine learning training system to probe internal agents, internal datastores, internal production logs of a subscriber to the service for additional training data samples for training a target newly identified competency. In some embodiments, one or more probes by S430 include database queries that may function to probe all available stores of data associated with a subscriber for training data samples. In a preferred embodiment, each of the one or more probes may be configured and/or structured based on utterance data from the cluster and/or the grouping of mishandled utterances for a given newly identified competency. In such embodiments, the probes may be database queries. In yet another embodiment, S430 may function to transmit probes to one or more internal sources of a subscriber that include human agents. In such embodiments, the one or more probes may include one or more prompts (e.g., rephrasing and/or restatement prompts) and/or seed samples based on the one or more utterances from a cluster and/or grouping of mishandled utterances.

Responsive to the probes to either or both of the internal and the external sources of training data, S430 may function to receive a plurality of training data samples that may be used for developing and/or training a target, newly identified dialogue competency of a dialogue system of a subscriber.

3.4 Configuring an Extensible Dialogue Control Structure

Figure 6:
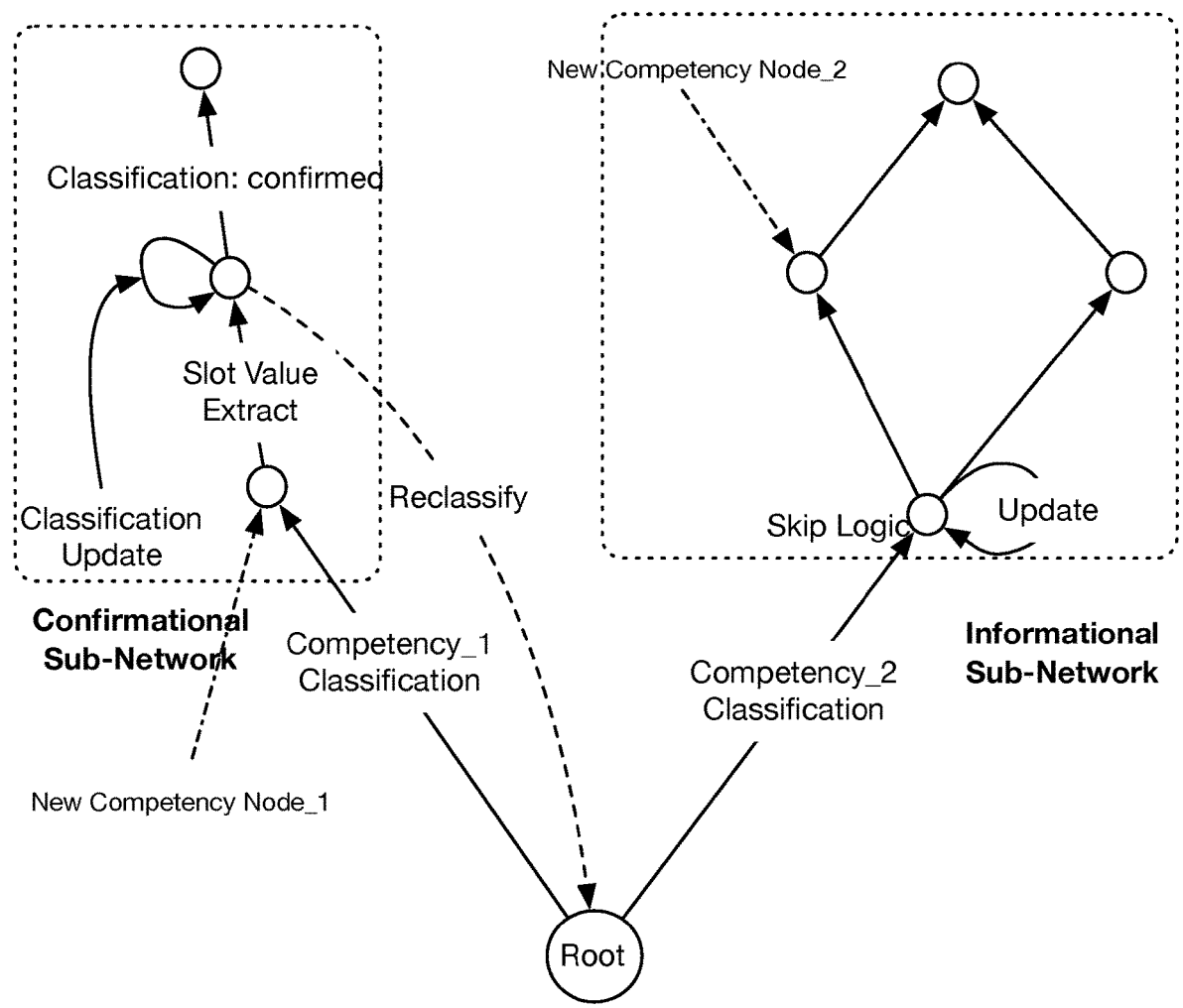
FIG. 6 illustrates a schematic representation of an example dialogue control structure having new dialogue competencies in accordance with one or more embodiments of the present application.

S440, which includes configuring a dialogue system control structure, may function to enable a structuring of a dialogue system control structure based on one or more newly identified dialogue competencies, as shown by way of example in FIG. 6. In a preferred embodiment, the dialogue system control structure may function to govern and/or control an operation of an automated dialogue agent and further, may govern a conversational flow path of a conversation and/or dialogue between the automated dialogue agent and a human user based on utterance input from the human user.

Preferably, the dialogue system control structure may be represented as a graphical control structure that includes a number of nodes and a number of edges that operate to connect distinct nodes within the graphical control structure. Preferably, the dialogue system control structure includes at least one root node, which may function as a point of origin of a dialogue and/or a conversation between an automated dialogue agent and a user.

Additionally, or alternatively, the dialogue system control structure may include a plurality of competency nodes (i.e., state nodes) of which a subset of the competency nodes may be graphically connected to the root node. Preferably, each (state/competency) node within the dialog system control structure may be configured to perform one or more classification tasks and/or one or more inferential tasks based on utterance input and one or more logical operations based on one or more logical annotations associated with a given node. Each graphical edge between two distinct nodes may preferably function to execute a logic function and/or variable dialogue data function based on a classification task, an inferential task, and/or operation of a first node of a pair of connected nodes.

It shall be noted that while, in one or more embodiments, in which a graphical user interface (GUI) may be used in construction the dialogue system control structure, the graphical edges may have a visually perceptible construct within the GUI, in other embodiments, some features of a dialog system control structure, such as the edge connections, may be represented and/or enabled using computer code or scripts (e.g., via an API or the like). That is, any feature of the dialogue system control structure that may be constructed and/or assembled using a GUI may also be represented and/or constructed using an API or other programmatic interface.

In one or more embodiments, S440 may function to and/or enable a construction of a node for each newly identified competency for a dialogue system control structure for a given subscriber. That is, in a graphical sense, S440 may function to graphically produce a node for each newly identified competency that may be subsequently arranged within the dialogue system control structure for the dialogue system of a subscriber.

Additionally, or alternatively, S440 may function to configure and/or set one or more standard or one or more basic dialogue nodes distinct from the nodes of the newly identified competencies based on an expected and/or an intended dialogue flow of the dialogue system of the subscriber. That is, for a given dialogue system of a subscriber, one or more intended and/or expected dialogue flows for handling distinct types of conversations between an automated dialogue agent and a user. In such instances, each intended and/or expected dialogue flow may include standard state nodes that may be typically required in addition to the state nodes for the new dialogue competencies. The standard state nodes may function to enable a fluid conversational flow between the automated dialogue agent and the user.

Additionally, in a functional sense, S440 may function to identify and/or configure the one or more machine learning models (e.g., machine learning classifiers) for each node that may function to perform the one or more classification and/or inferential tasks of a given node. An inferential task may include slot value predictions (SVP), as described in U.S. patent application Ser. No. 15/821,010, which is incorporated herein in its entirety by this reference.

In some embodiments, S440 may function to construct each new node for the one or more newly identified competencies according to at least one of a plurality of distinct node archetypes. That is, S440 may function to set and/or identify each new dialogue competency node as one of a plurality of distinct node archetypes. Each of the plurality of distinct node archetypes may function to serve at least one distinct conversational purpose, objective, and/or function of the dialogue system of a subscriber. In one example, the plurality of distinct conversational node archetypes may include an informational archetype, a confirmational archetype, an explorational archetype, and/or a subscriber-specific custom archetype. In one or more embodiments, each distinct node archetype may include a distinct machine learning model or a distinct ensemble of machine learning models different from a machine learning model or ensemble of machine learning model of other node archetypes.

In some implementations, S440 may function to automatically generate a proposed node archetype for a given new dialogue competency node based on attributes of the new dialogue competency node. In such implementations, S440 may function to assess a newly identified competency and estimate one or more conversational objectives of a given new competency node based on the one or more types of utterances and/or queries that the identified competency may be expected to handle. In some embodiments, S440 may function to map the identified conversational objectives of a given new competency to a node archetypal space that includes a mapping of conversational objectives and/or functions for each of a plurality of known or pre-existing node archetypes. Thus, S440 may function to estimate a node archetype based on superimposing the mapping of the conversational objectives and/or functions of the new dialogue competency onto a mapping of the node archetypal space.

In further implementations, S440 may function to enable a subscriber to select from the plurality of distinct node archetypes and/or identify a custom archetype for a given new dialogue competency node.

Additionally, or alternatively, based on a selection and/or identification of a node type for a given new dialogue competency, S440 may function to automatically generate proposed dialogue system control structures and/or proposed conversational/dialogue flow paths that include the new dialogue competency. It shall be noted that while one or more the techniques described in the method 400 may be used to automate the generation of one or more components of a dialogue system control structure, any suitable technique including, user-defined techniques (e.g., user-defined control structures, user-defined conversational flow paths, user-defined state nodes and graphical edges, etc.) may be employed either singly or in combination with the automated techniques.

Additionally, or alternatively, S440 may function to enable an intelligent arrangement and edge connection of each new competency node within the dialog system control structure. That is, S440 may function to automatically construct a proposed graphical representation of the dialog system control structure that includes each of the new competency nodes of the dialog system of a subscriber which may additionally include edge representations that illustrate the operable connections between each new competency node and another node, such as another new competency node, a standard node, or a root node.

In some embodiments, the proposed graphical representation of the dialog system control structure may include a plurality of proposed new nodes, the one or more newly identified competency nodes, and a proposed arrangement and edge connections between the nodes within the proposed graphical representation.

In one or more embodiments, configuring each new competency node within the dialog system control structure may include identifying a subset of new competency nodes and extending each of a plurality of distinct graphical edges from a root node to each of the subset of new competency nodes thereby forming a dialogue path from a beginning of a dialogue at the root node to one of the new competency nodes. Once at least a subset of new competency nodes may be connected to the root node via the one or more distinct edge connections, S440 may function to enable the extension of one or more graphical edges from the subset of new competency nodes to other nodes that may be arranged downstream.

Accordingly, it shall be noted that a build out of the dialogue system control structure may be performed in any suitable manner including using a combination of the above-described techniques. Additionally, it shall be noted that the techniques described herein may be used to augment, reconfigure, and/or enhance an existing dialog system.

In one or more preferred embodiments, the method 400 (e.g., S440) may function to enable a construction and/or configuring of a dialogue system control structure and/or any other component of a machine learning-based dialogue system via one or more of a graphical user interface (e.g., a web-based user interface), a programmatic interface (e.g., an application programming interface), and/or the like that enables interaction and/or control over the one or more modules, systems, software applications, and/or the like of a machine learning-based dialogue service or on-premise system used in the construction and/or configuring.

3.5 Node Training and Dialogue Control Structure Deployment

S450, which includes training one or more nodes of a dialogue system control structure, may function to enable each new competency node of the dialog system control structure by training the one or more machine learning models underpinning each new competency node. In a preferred embodiment, S450 may function to identify a distinct corpus of training data for each new competency node of the dialog system control structure. Preferably, the distinct corpus of training data is specifically compiled for training a distinct and/or respective new competency node. As described in S430, a corpus of training data may be sourced based on attributes of a grouping or cluster of mishandled utterances which, in turn, is also used to define and/or identify whether a new competency may be needed for a dialogue system. In one or more embodiments of the present application, the node training of the dialogue system control structure may be implemented with any suitable technique include the one or more novel techniques described in U.S. patent Ser. No. 10/296,848, which is incorporated herein in its entirety by this reference.

In some embodiments, S450 may function to evaluate an efficacy of each distinct corpus of training data prior to training machine learning models of a respective new competency node, as described in U.S. Pat. No. 10,303,978, which is incorporated herein in its entirety by this reference. For instance, S450 may function to assess the efficacy of a given corpus of training data based on computing a coverage metric and/or a diversity metric for the given corpus. In such instance, S450 may function to evaluate the coverage metric and/or the diversity metric against one or more of a coverage metric threshold and/or a diversity metric threshold that, if satisfied, may function to indicate that the given distinct corpus of training data is suitable for training machine learning models of a given new competency node.

Additionally, or alternatively, once each competency node of a dialogue system control structure is trained, S450 may function to deploy the dialogue system control structure in a live dialogue system of a subscriber or the like. In an active deployment, the dialogue system control structure may function to control one or more dialogue interactions between a user and an automated dialogue agent operated by the dialogue system.

3.6 Versioning—Data Corpus/Machine Learning Model Management

Additionally, and/or optionally, S460, which includes enabling source control, may function to enable a control and/or management of the various iterations and/or evolutions of the machine learning-based dialogue system, including but not limited to, the one or more versions of the dialog system control structure, the one or more versions of the data corpus (e.g., training data corpus, production log data corpus, etc.), and/or the like.

In some embodiments, S460 may function to enable the constructions, configurations, and/or changes to a machine learning-based dialog system to be stored and correspondingly, labeled or tagged with a distinct version identifier. In some embodiments, a distinct version identifier may be created for a version of the ML-based dialogue system based on an occurrence and/or identification of distinct building sessions. A building session may include a period in which one or more aspects of a ML-based dialogue system may be constructed and/or changed by a user or the like. Accordingly, a building session, in some embodiments, may include a period that is used to build or make changes to a functioning ML-based dialogue system or one or more distinct functioning components of the ML-based dialogue system.

In a preferred embodiment, a distinct version identifier may be generated after each building session and stored together with the machine learning-based dialogue system in its current condition.

Additionally, or alternatively, S460 may function to enable the augmentation and/or merging of distinct versions and/or components to a machine learning-based dialogue system. For instance, in some embodiments, a first component of a dialogue system, such as competency A, may be built distinctly from a second component of the dialogue system, such as competency B. In such example, S460 may function to enable a selection and merger of a version that includes competency A and another version that includes competency B thereby creating a new system, which may itself be assigned a distinct version identifier.

Accordingly, it shall be noted that any suitable augmentation and/or merger between dialogue system components, applications, programs, and/or the like may be achieved. For instance, S460 may enable a merger of a historical version of a machine learning-based dialogue system together with a current version of a machine learning-based dialogue system. Similarly, S460 may enable two historical versions of a machine learning-based dialogue system to be merged. Likewise, S460 may enable the augmentation of new system components, applications, or programs to a historical version of a machine learning-based dialogue system.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A system for intelligently configuring a machine learning-based dialogue system of a subscriber, the system comprising:
   a user interface for configuring a machine learning-based dialogue system for a subscriber that is in operable communication with a remote machine learning-based dialogue service;
   the remote machine learning-based dialogue service being implemented by a distributed network of computers includes:
   (i) a conversation deficiency module that implements a conversational deficiency assessment of a target dialog system of the subscriber to the machine learning-based dialog service, wherein implementing the conversational deficiency assessment includes:
- (i-a) identifying one or more distinct corpora of mishandled utterances based on an assessment of one or more distinct corpora of dialogue data;
- (i-b) identifying one or more candidate corpus of mishandled utterances from the one or more distinct corpora of mishandled utterances as one or more suitable candidates for building one or more new dialogue competencies for the target dialogue system if one or more candidate metrics of the one or more candidate corpus of mishandled utterances satisfy a candidate threshold;
- (ii) machine learning model configuration module that:
  - (ii-a) builds the one or more new dialogue competencies for the target dialogue system for each of the one or more candidate corpus of mishandled utterances having candidate metrics that satisfy the candidate threshold; and
  - (ii-b) constructs a corpus of training data for training one or more machine learning models defining a target new dialogue competency of the one or more new dialogue competencies of the target dialogue system, wherein constructing the corpus of training data includes sourcing training data from one or more distinct sources of machine learning training data based on attributes of mishandled utterance data within a target corpus of mishandled utterances of the one or more distinct corpora of mishandled utterances; and
- (iii) configures a dialogue system control structure for the target dialogue system based on the one or more new dialogue competencies, wherein the dialogue system control structure governs an operation of an automated dialogue agent of the target dialogue system of the subscriber.

2. A method for intelligently configuring a machine learning-based dialogue system, the method comprising:
implementing, by a machine learning-based dialogue service, a conversational deficiency assessment of a target dialog system of a subscriber to the machine learning-based dialog service,
wherein implementing the conversational deficiency assessment includes:
- (i) identifying one or more distinct corpora of mishandled utterances based on an assessment of one or more distinct corpora of dialogue data, wherein the assessment includes:
  - mapping each of a plurality of mishandled utterances of the target dialogue system to a vector space; and
  - clustering one or more subsets of the plurality of mishandled utterances based on identifying and grouping together mishandled utterances within a predefined radius of a centroid of a dense mass of mishandled utterances;
- (ii) identifying one or more candidate corpus of mishandled utterances from the one or more distinct corpora of mishandled utterances as one or more suitable candidates for building one or more new dialogue competencies for the target dialogue system if one or more candidate metrics of the one or more candidate corpus of mishandled utterances satisfy a candidate threshold;
building the one or more new dialogue competencies for the target dialogue system for each of the one or more candidate corpus of mishandled utterances having candidate metrics that satisfy the candidate threshold; and
configuring a dialogue system control structure for the target dialogue system based on the one or more new dialogue competencies, wherein the dialogue system control structure governs an operation of an automated dialogue agent of the target dialogue system of the subscriber.

3. The method according to claim 2, wherein
each of the one or more distinct corpora of mishandled utterances relates to a collection of utterances posed to the target dialogue system that were ineffectively handled by the target dialogue system.

4. The method according to claim 2, wherein:
each of the one or more distinct corpora of mishandled utterances relate to one or more distinct groupings of historical utterances posed to the dialog system of which the dialogue system failed to provide a successful response to historical utterances of the one or more groupings of historical utterances.

5. The method according to claim 2, wherein
a subset of mishandled utterances defining each of the one or more distinct corpora of mishandled utterances relates to a grouping of utterances having a dialog intent that is misaligned with an intent applied or computed by the target dialogue system.

6. The method according to claim 2, wherein
the assessment of the one or more distinct corpora of dialogue data of the target dialog system includes:
- computing a density metric value for each of the one or more distinct corpora of mishandled utterances;
- evaluating the density metric for each respective one of the one or more distinct corpora of mishandled utterances against a density threshold;
- if the density metric value for the respective one of the one or more distinct corpora of mishandled utterances satisfies the density threshold, identifying the respective one as the suitable candidate for building a new dialogue competency for the target dialogue system of the subscriber.

7. The method according to claim 6, wherein
the density threshold relates to a minimum density value, if satisfied, indicates that a new competency can be defined or constructed based on mishandled utterance data within the respective one of the one or more distinct corpora of mishandled data.

8. The method according to claim 2, wherein
the assessment of the one or more distinct corpora of dialogue data of the target dialog system includes:
- computing a proximity metric value for each of the one or more distinct corpora of mishandled utterances;
- evaluating the proximity metric for each respective one of the one or more distinct corpora of mishandled utterances against a proximity threshold;
- if the proximity metric value for the respective one of the one or more distinct corpora of mishandled utterances satisfies or exceeds the proximity threshold, identifying the respective one as the suitable candidate for building a new dialogue competency for the target dialogue system of the subscriber.

9. The method according to claim 8, wherein
the proximity threshold relates to a minimum required distance between a target corpora of mishandled utterances and any cluster or corpus of utterance data associated with an existing dialogue competency of the target dialog system of the subscriber.

10. The method according to claim 2, wherein
building the one or more new dialogue competencies for the target dialogue system includes:
setting one or more machine learning models that are untrained for each of the one or more new dialogue competencies.

11. The method according to claim 10, further comprising:
constructing a corpus of training data for training one or more machine learning models defining a target new dialogue competency of the one or more new dialogue competencies of the target dialogue system, wherein constructing the corpus of training data includes sourcing training data from one or more distinct sources of machine learning training data based on attributes of mishandled utterance data within a target corpus of mishandled utterances of the one or more distinct corpora of mishandled utterances; and
training the one or more machine learning models using training samples from the corpus of training data.

12. The method according to claim 11, wherein
once the one or more machine learning models are trained, each of the one or more new dialogue competencies of the target dialogue system performs one or more dialogue intent classification tasks using the one or more machine learning models for predicting one or more dialogue intents of a user involved in a conversation with an automated dialogue agent of the target dialogue system of the subscriber.

13. The method according to claim 11, wherein
sourcing the training data includes:
building a corpus of seed samples based on a sampling of the mishandled utterance data within of the target corpus of mishandled utterances of the one or more distinct corpora of mishandled utterances; and
sourcing the training data from a remote crowdsourcing platform based on the corpus of seed samples.

14. The method according to claim 11, wherein
sourcing the training data includes:
building a corpus of seed samples based on a sampling of the mishandled utterance data within of the target corpus of mishandled utterances of the one or more distinct corpora of mishandled utterances; and
probing one or more internal data sources of the subscriber for the training data based using the corpus of seed samples.

15. The method according to claim 14, further comprising:
if the training data for training of the one or more machine learning models defining each of the one or more new dialogue competencies satisfy one or more efficacy threshold, deploying each of the one or more new dialog competencies in the target dialogue system.

16. The method according to claim 2, wherein
configuring the dialogue system control structure of the target dialogue system of the subscriber includes:
within a graphical representation of the dialogue system control structure, setting a plurality of distinct state nodes and setting each of a plurality of distinct edges between pairs of the plurality of distinct state nodes, wherein setting the plurality of distinct state nodes includes setting the one or more new dialogue competencies as one or more of the plurality of distinct state nodes.

17. The method according to claim 16, wherein
configuring the dialogue system control structure of the target dialogue system of the subscriber includes:
setting an archetype that is selected from a plurality of distinct archetypes for each of the one or more new dialogue competencies of the target dialogue system based on attributes of mishandled utterance data within a target corpus of mishandled utterances of the one or more distinct corpora of mishandled utterances.

18. The method according to claim 2, further comprising:
responsive to an utterance input to the target dialogue system, of the subscriber implementing the automated dialogue agent of the target dialogue system of the subscriber using the dialogue system control structure to provide a successful response to the utterance input.

19. The method according to claim 2, wherein
the dialogue system control structure relates to a graphically-based structure that governs an operation and communication between multiple machine learning models and dialogue response generating components of the target dialogue system of the subscriber.

20. A method for intelligently configuring a machine learning-based dialogue system, the method comprising:
implementing, by a machine learning-based dialogue service, a conversational deficiency assessment of a target dialog system of a subscriber to the machine learning-based dialog service,
wherein implementing the conversational deficiency assessment includes:
(i) identifying one or more distinct corpora of mishandled utterances based on an assessment of the one or more distinct corpora of dialogue data;
(ii) identifying one or more candidate corpus of mishandled utterances from the one or more distinct corpora of mishandled utterances as one or more suitable candidates for building one or more new dialogue competencies for the target dialogue system if one or more candidate metrics of the one or more candidate corpus of mishandled utterances satisfy a candidate threshold;
building the one or more new dialogue competencies for the target dialogue system for each of the one or more candidate corpus of mishandled utterances having candidate metrics that satisfy the candidate threshold; and
configuring a dialogue system control structure for the target dialogue system based on the one or more new dialogue competencies, wherein the dialogue system control structure governs an operation of an automated dialogue agent of the target dialogue system of the subscriber, wherein configuring the dialogue system control structure of the target dialogue system of the subscriber includes:
within a graphical representation of the dialogue system control structure, setting a plurality of distinct state nodes and setting each of a plurality of distinct edges between pairs of the plurality of distinct state nodes, wherein setting the plurality of distinct state nodes includes setting the one or more new dialogue competencies as one or more of the plurality of distinct state nodes.

* * * * *